(12) United States Patent
Nowak et al.

(10) Patent No.: US 12,468,674 B2
(45) Date of Patent: Nov. 11, 2025

(54) ARTIFICIAL INTELLIGENCE SYSTEM FOR DATA QUALITY RESOLUTION

(71) Applicant: Capital One Services, LLC, McLean, VA (US)

(72) Inventors: Matthew Louis Nowak, Midlothian, VA (US); Catherine Barnes, Glen Allen, VA (US); Maqbool A. Khatri, Glen Allen, VA (US); Kelvin Wong, Brooklyn, NY (US); James C. McGrory, Richmond, VA (US); Justin Cheng, Vienna, VA (US); Rees Draminski, Vienna, VA (US); Alan Christopher Weaver, Glen Allen, VA (US); David Walter Peters, Richmond, VA (US); Narender Pashikant, Ashburn, VA (US); Sean O'Neill, Collegeville, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/511,400

(22) Filed: Nov. 16, 2023

(65) Prior Publication Data

US 2025/0165443 A1  May 22, 2025

(51) Int. Cl.
| | | |
|---|---|---|
| G06F 16/00 | (2019.01) | |
| G06F 16/215 | (2019.01) | |
| G06F 16/26 | (2019.01) | |

(52) U.S. Cl.
CPC ........... *G06F 16/215* (2019.01); *G06F 16/26* (2019.01)

(58) Field of Classification Search
None
See application file for complete search history.

(56) References Cited

U.S. PATENT DOCUMENTS

| 11,921,698 | B2 * | 3/2024 | Gawande | G06F 16/215 |
|---|---|---|---|---|
| 2012/0150825 | A1 * | 6/2012 | Chaturvedi | G06F 16/215 |
| | | | | 707/E17.005 |
| 2020/0133257 | A1 * | 4/2020 | Cella | G05B 19/4183 |
| 2020/0348662 | A1 * | 11/2020 | Cella | G05B 19/41865 |
| 2021/0090694 | A1 * | 3/2021 | Colley | G16B 30/00 |
| 2021/0133670 | A1 * | 5/2021 | Cella | G06N 3/044 |
| 2021/0157312 | A1 * | 5/2021 | Cella | G01M 13/045 |
| 2022/0108262 | A1 * | 4/2022 | Cella | G05B 17/02 |
| 2022/0283996 | A1 * | 9/2022 | Lecaillon | G06F 11/3428 |
| 2022/0342862 | A1 * | 10/2022 | Tadepally | G06F 16/215 |
| 2023/0177026 | A1 * | 6/2023 | Pushpavanam | G06F 16/285 |
| | | | | 707/692 |
| 2023/0177379 | A1 * | 6/2023 | Pushpavanam | G06F 16/285 |
| | | | | 706/12 |

* cited by examiner

*Primary Examiner* — Farhan M Syed
(74) *Attorney, Agent, or Firm* — Harrity & Harrity, LLP (57) ABSTRACT

In some implementations, a data quality system may receive an incoming data set for data quality analysis. The data quality system may obtain data quality validation information from one or more data repositories that form a data quality knowledge base. The data quality system may use one or more machine learning models to evaluate whether the incoming data set has one or more anomalies based on the data quality validation information. The data quality system may generate data quality results for the incoming data set based on an output from the one or more machine learning models. The data quality system may update the data quality knowledge base in accordance with the data quality results for the incoming data set.

20 Claims, 7 Drawing Sheets

ARTIFICIAL INTELLIGENCE SYSTEM FOR DATA QUALITY RESOLUTION

BACKGROUND

"Data quality" generally refers to measures or metrics that represent the state of qualitative and/or quantitative data elements. Although there are various measures or metrics that may be used to indicate data quality (e.g., accuracy, completeness, consistency, validity, uniqueness, and/or timeliness, among other examples), data is typically considered high quality when the data is well-suited to serve a specific purpose (e.g., an intended use in operations, decision-making, and/or planning) and/or when the data correctly represents a real-world construct to which the data refers. In some cases, perspectives on data quality can differ, even with regard to the same dataset used for the same purpose. In such cases, data governance may be used to form agreed-upon definitions and standards for quality. For example, data governance may encompass people, processes, and/or information technology needed to consistently and properly handle data across an organization, with key focus areas including data availability, usability, consistency, integrity, security, and standard compliance.

SUMMARY

Some implementations described herein relate to a system for validating and resolving data quality. The system may include one or more memories and one or more processors communicatively coupled to the one or more memories. The one or more processors may be configured to receive an incoming data set for data quality analysis. The one or more processors may be configured to obtain data quality validation information from one or more data repositories that form a data quality knowledge base, wherein the data quality validation information includes documented rules that define requirements and an expected format for the incoming data set, historical data sets that have been evaluated for data quality issues, and historical data quality results related to the historical data sets. The one or more processors may be configured to use one or more machine learning models to evaluate whether the incoming data set has one or more anomalies based on the data quality validation information. The one or more processors may be configured to generate data quality results for the incoming data set based on an output from the one or more machine learning models. The one or more processors may be configured to update the one or more data repositories that form the data quality knowledge base in accordance with the data quality results for the incoming data set.

Some implementations described herein relate to a method for validating and resolving data quality. The method may include receiving, by a data quality system, an incoming data set for data quality analysis. The method may include obtaining, by the data quality system, data quality validation information from one or more data repositories that form a data quality knowledge base, wherein the data quality validation information comprises documented rules that define requirements and an expected format for the incoming data set, historical data sets that have been evaluated for data quality issues, and historical data quality results related to the historical data sets. The method may include using, by the data quality system, one or more machine learning models to evaluate whether the incoming data set has one or more anomalies based on the data quality validation information. The method may include generating, by the data quality system, data quality results for the incoming data set based on an output from the one or more machine learning models, wherein generating the data quality results includes using the one or more machine learning models to identify one or more fixes to be applied to the incoming data set based on the data quality results for the incoming data set including an indication that the incoming data set has one or more anomalies. The method may include updating, by the data quality system, the one or more data repositories that form the data quality knowledge base in accordance with the data quality results for the incoming data set.

Some implementations described herein relate to a non-transitory computer-readable medium that stores a set of instructions. The set of instructions, when executed by one or more processors of a data quality system, may cause the data quality system to receive an incoming data set for data quality analysis. The set of instructions, when executed by one or more processors of the data quality system, may cause the data quality system to obtain data quality validation information from one or more data repositories that form a data quality knowledge base, wherein the data quality validation information includes documented rules that define requirements and an expected format for the incoming data set, historical data sets that have been evaluated for data quality issues, and historical data quality results related to the historical data sets. The set of instructions, when executed by one or more processors of the data quality system, may cause the data quality system to use one or more machine learning models to evaluate whether the incoming data set has one or more anomalies based on the data quality validation information. The set of instructions, when executed by one or more processors of the data quality system, may cause the data quality system to generate data quality results for the incoming data set based on an output from the one or more machine learning models, wherein the data quality results for the incoming data set include an indication that the incoming data set has been validated based on one or more of the output from the one or more machine learning models or a user of a client device indicating that the incoming data set does not contain any anomalies. The set of instructions, when executed by one or more processors of the data quality system, may cause the data quality system to update the one or more data repositories that form the data quality knowledge base in accordance with the data quality results for the incoming data set.

DETAILED DESCRIPTION

The following detailed description of example implementations refers to the accompanying drawings. The same reference numbers in different drawings may identify the same or similar elements.

Data quality is typically measured using one or more metrics that indicate how well-suited a dataset is to serve a specific purpose (e.g., a data analytics use case). For example, data quality metrics may include an accuracy metric to indicate whether the dataset reflects actual, real-world scenarios, a completeness metric to indicate whether the dataset effectively delivers all available values, a consistency metric to indicate whether the dataset includes uniform and/or non-conflicting values in different storage locations, a validity metric to indicate whether the dataset was collected according to defined business rules and parameters, conforms to a correct format, and/or falls within an expected range, a uniqueness metric to indicate whether there are any duplications or overlapping values across datasets, and/or a timeliness metric to indicate whether the dataset is available when required. In order to determine whether a given dataset is high quality (e.g., fit to serve an intended purpose), an organization may utilize data quality analysts to conduct data quality assessments in which individual data quality metrics are assessed and interpreted to derive intelligence related to the quality of the data within the organization.

In this way, organizations may identify and/or resolve data quality issues, such as duplicated data, incomplete data, inconsistent data, incorrect data, poorly defined data, poorly organized data, and/or poor data security. Furthermore, data quality rules are often an integral component of data governance, which includes processes to develop and establish a defined, agreed-upon set of rules and standards by which all data across an organization is governed. Effective data governance should harmonize data from various data sources, create and monitor data usage policies, and eliminate inconsistencies and inaccuracies that would otherwise negatively impact data analytics accuracy and/or regulatory compliance. However, monitoring data quality and/or managing data governance practices is associated with various challenges because organizations often have large amounts of data stored in databases that are usually updated on a regular basis (e.g., daily, monthly, or at other suitable intervals). For example, having a data analyst manually check each data point is difficult and impractical (e.g., because manually updating threshold allowances when there is a change in circumstances for a data element may require a large number of man-hours), and it is difficult to create data quality rules that are both broad enough to allow for natural variation while still catching true abnormalities. Furthermore, common hard-coded data quality rules that govern a database are typically created by a data analyst using only data that is available at the point in time when the data quality rules are created. In cases where the nature of the data shifts over time (e.g., a change in circumstances results in a durable change to a typical data value), more manpower would be required to update each data quality rule to reflect the new data norm.

For example, when a database is created, subject matter experts usually configure data quality rules that are defined as thresholds (e.g., an upper threshold and a lower threshold defining an expected range for a given data value). In many cases, the thresholds are arbitrary, only intuited by the subject matter expert based on what has occurred in the past. Moreover, considering every data field in order to define reasonable thresholds that catch data quality problems without causing an excessive number of false positives tends to be very time consuming. In addition to the hours that are spent creating the data quality threshold rules, the rules often need to be updated to reflect how the nature of the data has changed. For example, in a database table that is updated with one row per customer each month, an upload with 1000 rows may reasonably be considered an error or potential data quality concern if the table included 500 rows for 500 customers at the time the table was created. However, if the organization were to expand over time, using a threshold of 1000 rows to flag a potential data quality issue would no longer make sense. Accordingly, in existing data quality systems, the threshold value(s) used in a data quality rule would need to be manually updated. Existing techniques to monitor data quality therefore suffer from various drawbacks, which include wasted manual checks, excessive rule creation time, and/or a tendency to become obsolete over time, among other examples.

Some implementations described herein relate to a data quality system that may use artificial intelligence and/or machine learning techniques to determine whether an incoming data set is valid or invalid (e.g., based on whether the incoming data set satisfies or fails to satisfy documented rules and/or standards related to data quality). Furthermore, in cases where the incoming data set is determined to be invalid (e.g., contains one or more anomalies), the data quality system may also use artificial intelligence and/or machine learning techniques to identify potential fixes to resolve the data quality issues. In some cases, the data quality system may automatically implement the fixes, or the fixes may be suggested to a human approver for review. Furthermore, the data quality system may trigger human intervention in cases where there is a low confidence that an incoming data set is valid or invalid. The data quality system may also create feedback related to evaluated data sets, data quality successes/failures, and implemented/suggested fixes to build a knowledge base for evaluating data quality. For example, in some implementations, the data quality knowledge base may include documented rules that define requirements and an expected format (e.g., an expected structure or the like) for incoming data sets, historical data sets that have been evaluated for data quality issues, and/or historical data quality results related to the historical data sets, among other examples. In this way, the data quality system described herein may use one or more artificial intelligence and/or machine learning models to automatically perform a data quality check for each new data ingestion based on existing (e.g., previously evaluated) data sets, previous data quality successes, failures, and issues, and/or documented standards and/or rules related to data quality. Accordingly, the data quality system may conserve computing resources and reduce delays that would otherwise result from manual data quality checks using complex instructions and/or repetitive processing.

Figure 1A:
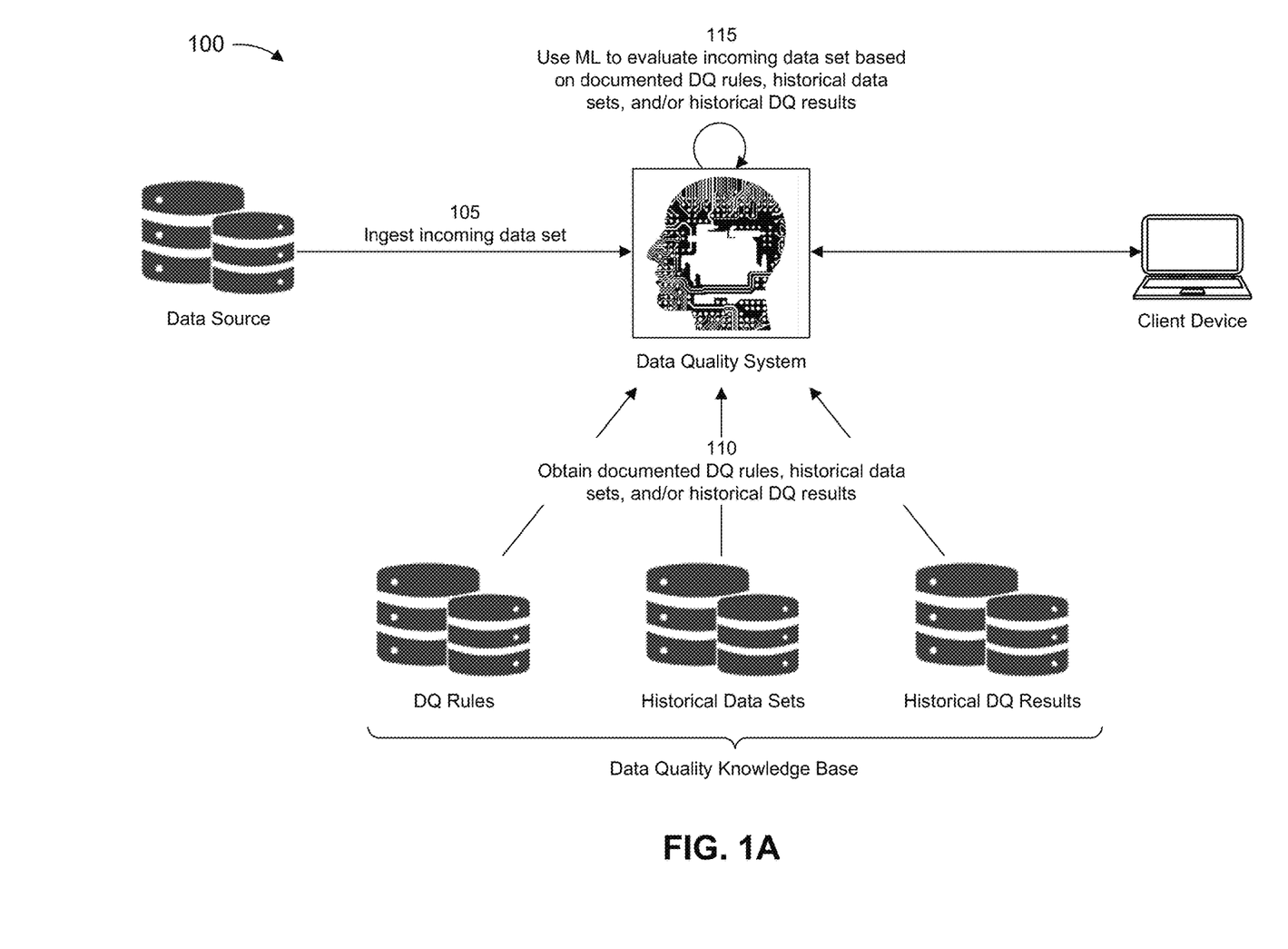
FIGS. 1A-1C are diagrams of an example associated with an artificial intelligence system for data quality resolution, in accordance with some embodiments of the present disclosure.
Figure 1B:
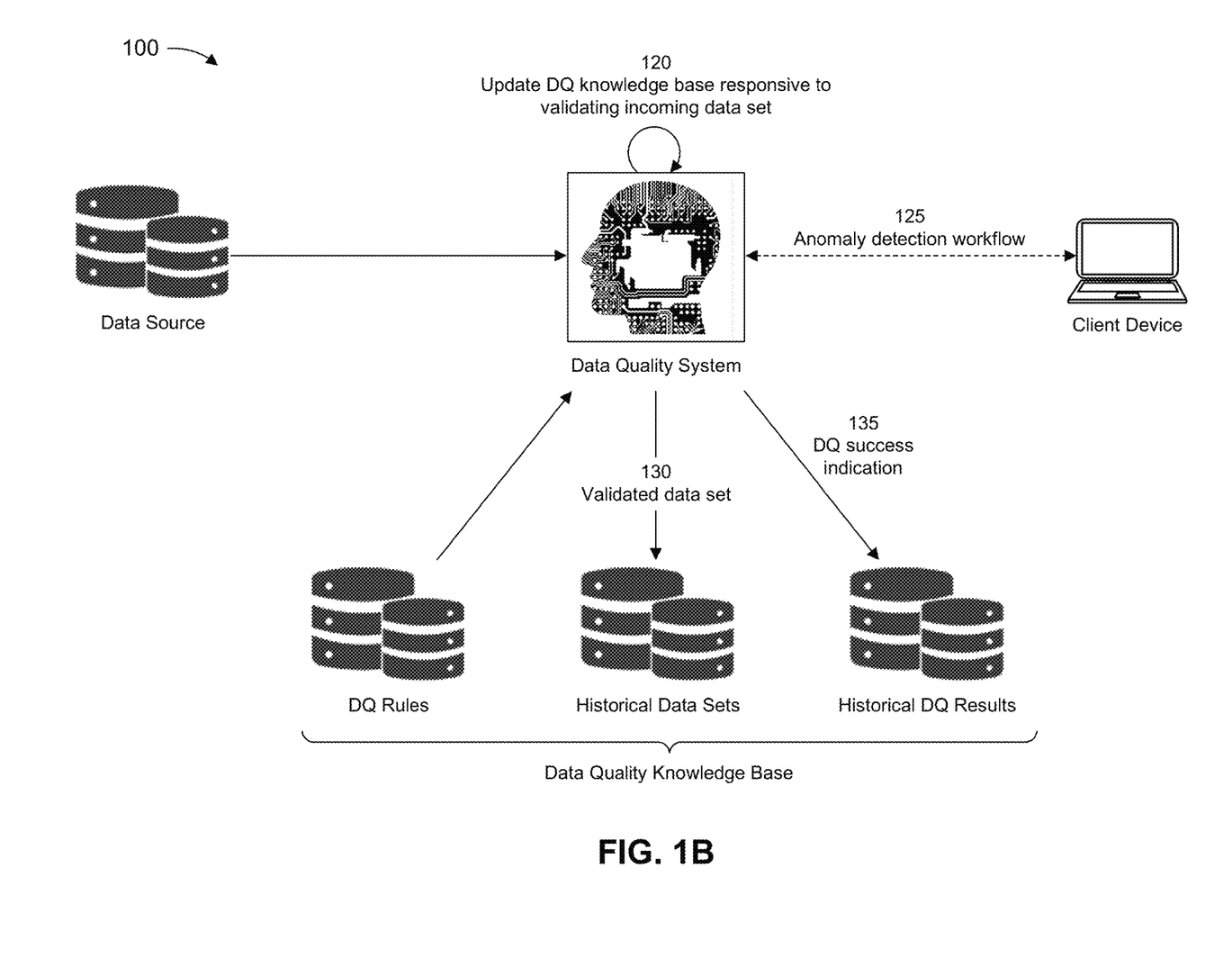
Figure 1C:
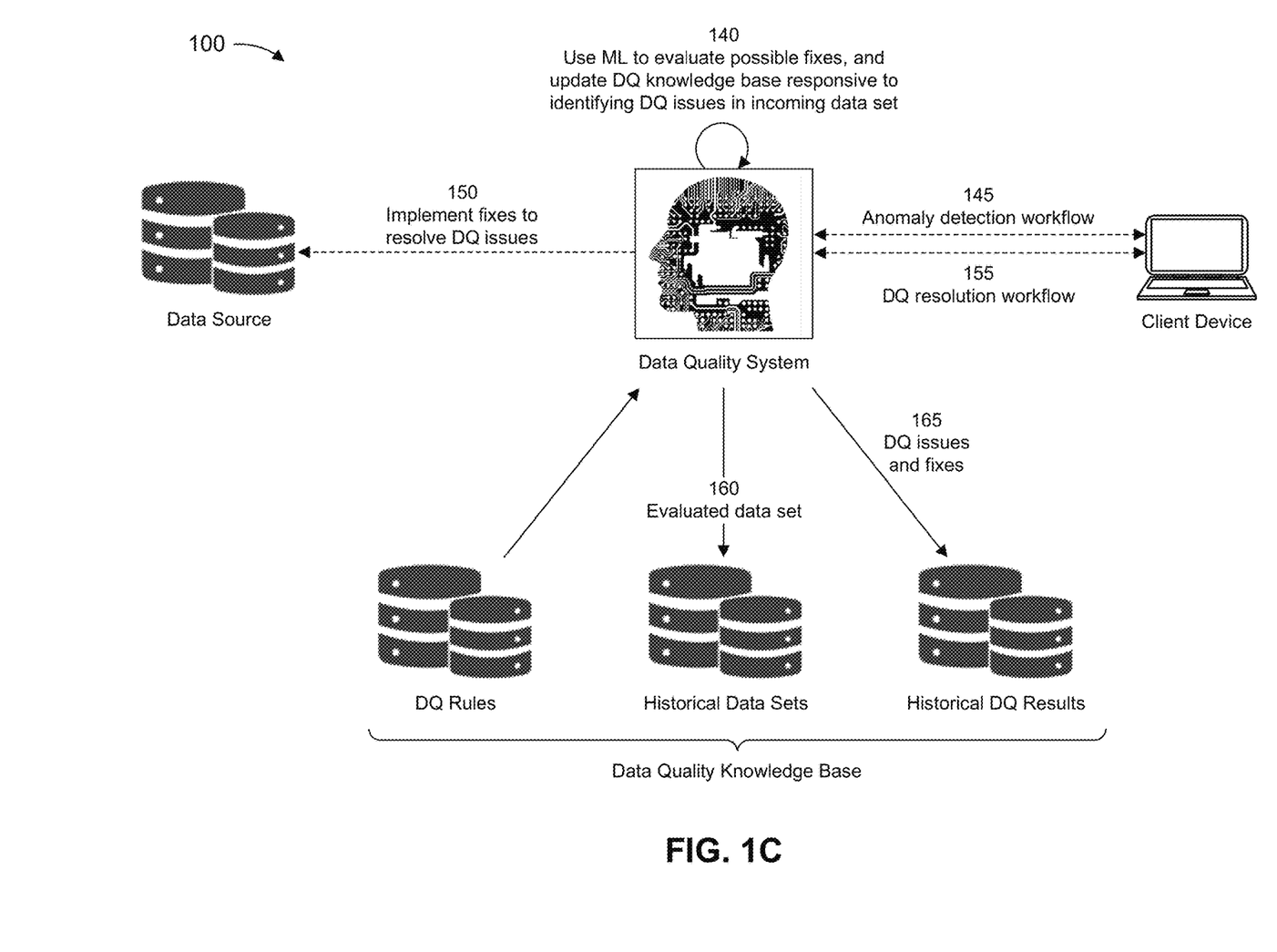

FIGS. 1A-1C are diagrams of an example 100 associated with an artificial intelligence system for data quality resolution. As shown in FIGS. 1A-1C, example 100 includes a data source, a data quality system, a data quality knowledge base, and a client device. The data source, the data quality system, the data quality knowledge base, and the client device are described in more detail in connection with FIG. 3 and FIG. 4.

As shown in FIG. 1A, and by reference number 105, the data quality system may ingest (e.g., receive or otherwise obtain) an incoming data set from the data source. For example, in some implementations, the data source may generally store one or more data sets that are updated at periodic intervals (e.g., at a set cadence, such as monthly, weekly, daily, or at other suitable intervals), and the data quality system may ingest the one or more data sets to import, collect, or otherwise obtain data sets that may originate from various sources into a centralized storage repository or processing system for data quality analysis. For example, in some implementations, the incoming data set that is ingested for data quality analysis may generally include one or more data values (e.g., values for data items) or data records (e.g., logically related sets of data values that represent real-world objects or constructs) that may be stored by the data source as structured data. For example, as described herein, structured data may include any suitable data that has an identifiable structure or organization that conforms to a data model or schema, is presented in rows and columns or another tabular format (e.g., in a relational database), is organized such that the data has a definition, format, and meaning that is explicitly understood, and/or organizes information in a manner that is easy to access and query. Accordingly, as described herein, the ingested data set may include any suitable set of data values and/or data records to be evaluated by the data quality system, such as a new data set, a new data entry, or new data associated with an existing (e.g., previously evaluated) data set.

In some implementations, the data quality system may use batch processing techniques, stream processing techniques, and/or data replication techniques to ingest the incoming data set such that the incoming data set can be evaluated for compliance or non-compliance with one or more data quality standards using one or more artificial intelligence or machine learning models. For example, batch processing techniques may involve collecting the data associated with the incoming data set in segments or batches that are then processed in bulk. In some implementations, the batch processing techniques may be used when the incoming data set being ingested for data quality analysis has a large volume of data, as batch processing may provide a capability to handle complex transformations and/or cleansing operations on the incoming data set prior to the data quality analysis. Additionally, or alternatively, the data quality system may use stream processing techniques for real-time data ingestion and data quality analysis, which may involve a continuous ingestion of data as the data is generated or stored by the data source (e.g., after being processed by one or more extract, transform, load (ETL) pipelines and/or data cleansing techniques). Additionally, or alternatively, the data quality system may use data replication techniques to maintain synchronized copies of the ingested data set across multiple systems or databases (e.g., to ensure data availability, reliability, and/or disaster recovery).

As further shown in FIG. 1A, and by reference number 110, the data quality system may obtain data quality validation information from one or more data repositories that form the data quality knowledge base. As shown in FIG. 1A, the one or more data repositories that form the data quality knowledge base may store documented data quality rules that define requirements and an expected format (e.g., an expected structure or the like) for the incoming data set, historical data sets that have previously been evaluated for data quality issues, and historical data quality results related to the outcomes of the data quality analysis performed for the historical data sets. For example, in some implementations, the data quality rules may generally be derived from business rules in order to specify one or more parameters to ensure that a data set, data value, or the like satisfies data quality standards related to accuracy, completeness, consistency, uniqueness, or the like. For example, in some implementations, the documented data quality rules may include data element content rules that specify valid values, ranges, lengths, data types, patterns, and/or domains, that specify whether a given data element is mandatory or optional (e.g., to evaluate completeness), and/or a reasonable distribution of values. Accordingly, the data element content rules may generally specify one or more parameters or constraints for a single data element, which may indicate whether the single data element is valid or invalid. For example, in a data set that includes customer information, a data element content rule may specify that the customer information is expected to have a fairly even distribution of birthdays, and that a much larger number of birthdays on a given day indicates a potential data quality issue.

Additionally, or alternatively, the documented data quality rules may include cross data element validation rules, which may be evaluated by inspecting values in multiple data elements (typically in a single data set) to determine whether the data elements satisfy the applicable cross data element validation rule(s). For example, in some implementations, the cross data element validation rules may indicate one or more valid values that depend on other column values (e.g., data values that indicate otherwise valid location codes may be deemed invalid if the location code does not fall within a range of values associated with a region code), may indicate one or more optional values that become mandatory when other column(s) contain certain data (e.g., an optional "collateral" field may become mandatory when a loan type column includes a "mortgage" or "vehicle" value), may indicate one or more mandatory values that become null when other column(s) contain certain data (e.g., a mandatory "agent name" field may be required to be empty if an "origination point" field is set to "web" to indicate that the customer applied for an insurance policy online), and/or cross-table validation rules that check columns and/or combinations of columns across tables (e.g., a "city" field and a "state" field in an address table may be cross-validated, to ensure that a state listed in the "state" field includes a city listed in the "city" field). Additionally, or alternatively, the documented data quality rules may include cross data file validation rules that check data elements and/or combinations of data elements across data files. For example, the cross data file validation rules may indicate one or more criteria for determining the mandatory presence of foreign key relationships (e.g., an account table may be required to have a value in a customer identifier column that matches a value in a customer identifier column of a customer table), for determining the optional presence of foreign key relationships, and/or for determining whether columns in different tables are consistent.

Accordingly, as described herein, the data quality validation information obtained from the data quality knowledge base may generally include various documented rules that define requirements and an expected format or an expected structure for the incoming data set. For example, in some implementations, the documented rules may include one or more data element content rules, cross data element validation rules, and/or cross data file validation rules that may be evaluated to determine whether one or more data values or data elements contained in the data set conform to the documented rules for validating data quality. Additionally, or alternatively, the documented rules may have other suitable forms or structures, such as domain rules that define lists of values that a given data element is allowed to have, domain pattern rules that define a list of patterns or regular expression syntaxes that a data element is allowed to conform to (e.g., a telephone number pattern may include ten consecutive digits or ten digits that are offset by parentheses and/or hyphens), domain range rules that define ranges of values that a data element is allowed to have, common format rules that define known common formats that are allowed for a data element, no nulls rules that specify that a given data element cannot have null values, unique key rules that define whether a data element or group of data elements are unique in a given data object, referential rules that define whether a data element or group of data elements is unique in a given data object, and/or custom data rules that apply structured query language (SQL) expressions or other parameters for determining whether a data element is valid (e.g., the custom rules may be defined to ensure compatibility or consistency that enables use of the data set by one or more downstream data analytics applications).

As further shown in FIG. 1A, and by reference number 115, the data quality system may use one or more machine learning (ML) models to evaluate whether the incoming data set has one or more anomalies or other potential data quality issues based on the data quality validation information obtained from the data quality knowledge base. For example, as described herein, machine learning generally involves computers learning from data to perform tasks. Machine learning algorithms are used to train machine learning models based on sample data, known as "training data" (e.g., sample data that indicates valid and/or invalid data elements). Once trained, machine learning models may be used to make predictions, decisions, or classifications relating to new observations (e.g., whether a data element in an incoming data set being evaluated is valid, invalid, or otherwise associated with data quality issues). For example, in some implementations, the data quality system may use the one or more machine learning models to evaluate the incoming data set (e.g., using natural language processing, regression analysis, decision trees, and/or other suitable machine learning algorithms) against the documented data quality rules, existing or historical data sets (e.g., previous versions of the incoming data set, previously evaluated data sets that are related to the incoming data set, and/or previously evaluated data sets that are unrelated to the incoming data set), and/or results of previous data quality evaluations (e.g., log stores, pipeline logs, enterprise incidents, and/or other logged data quality evaluation information that indicates data quality successes, failures, anomalies, issues, and/or fixes that the one or more machine learning models applied or recommended in order to remedy or resolve one or more data anomalies or data quality issues).

Accordingly, as described herein, the data quality system may generate data quality results for the incoming data set based on an output from the one or more machine learning models. For example, in some implementations, the data quality results may indicate whether the incoming data set satisfies or fails to satisfy a set of requirements and/or standards related to data quality, and/or may indicate whether individual data elements or data records included in the incoming data set satisfy or fail to satisfy requirements and/or standards related to data quality. For example, in some implementations, the output from the machine learning model(s) may include an indication that the incoming data set or an individual data element or data record satisfies or fails to satisfy the requirements and/or standards related to data quality, where the indication may be associated with a confidence level. In some implementations, the data quality system may validate the incoming data set or certain data elements included in the incoming data set when there is a high confidence that the incoming data set or data elements included in the incoming data set satisfy the requirements and/or standards related to data quality, or the data quality system may identify one or more data quality issues when there is a high confidence that the incoming data set or data elements included in the incoming data set fails to satisfy the requirements and/or standards related to data quality. Furthermore, depending on the confidence level, the data quality system may automatically validate the incoming data set or the data elements included in the incoming data set and/or implement potential fixes to resolve anomalies or other data quality issues, or the data quality system may trigger one or more workflows that involve interaction with a user operating the client device when there is a low confidence in the output from the one or more machine learning models.

For example, as described in further detail herein, FIG. 1B depicts an example associated with the output from the one or more machine learning models indicating that the incoming data set or an individual data element or data record satisfies the requirements and/or standards related to data quality, and FIG. 1C depicts an example associated with the output from the one or more machine learning models indicating that the incoming data set or an individual data element or data record fails to satisfy the requirements and/or standards related to data quality. In either case, the data quality system may update the one or more data repositories that form the data quality knowledge base in accordance with the data quality results for the incoming data set such that the one or more machine learning models may continue to learn as data sets are validated, as data quality issues are detected and/or resolved, and/or as potential fixes are applied, approved, or rolled back (e.g., discarded based on the user of the client device rejecting the recommended fixes).

For example, as shown in FIG. 1B, and by reference number 120, the data quality system may update the data quality knowledge base responsive to validating the incoming data set. More particularly, as described herein, the data quality system may use the one or more artificial intelligence or machine learning models to evaluate the values of the data elements contained in the incoming data set against the documented data quality rules, and may then further use the one or more artificial intelligence or machine learning models to evaluate the values of the data elements contained in the incoming data set against the historical data sets and/or historical data quality results to determine whether there are one or more anomalies or other data quality issues contained in the incoming data set. In some implementations, the one or more artificial intelligence or machine learning models may generate an output that indicates whether the incoming data set has passed a data quality validation check (e.g., satisfies requirements specified in the documented data quality rules, exhibits similarities to historical data sets that have been deemed to be valid, does not exhibit anomalies relative to historical data sets that have been deemed to be valid, and/or does not exhibit similarities to historical data sets that have been deemed to be invalid, among other examples).

In general, when the output generated by the one or more artificial intelligence or machine learning models indicates that the incoming data set satisfies the applicable data quality standards, the output may be associated with a confidence level that indicates a probability or likelihood of the output being correct that the incoming data set satisfies the applicable data quality standards. In cases where the confidence level satisfies a threshold indicating a high confidence that the incoming data set satisfies the applicable data quality standards, the data quality system may automatically update the one or more data repositories that form the data quality knowledge base to include the data quality results for the incoming data set. Alternatively, as shown by reference number 125, the data quality system may trigger the client device to perform an anomaly detection workflow for the incoming data set when the output generated by the one or more artificial intelligence or machine learning models indicates that the incoming data set does not contain any anomalies or other data quality issues with a confidence level that fails to satisfy a threshold. In such cases, the data quality system may generate one or more user interfaces to indicate the potential anomalies or data quality issues to the client device, and a user of the client device may review the potential anomalies or data quality issues to confirm that the anomalies or data quality issues exist, or indicate that the potential anomalies or data quality issues are false positives.

Accordingly, as described herein, the data quality system may validate the incoming data set (e.g., generate an indication that the incoming data set does not contain data anomalies or other data quality issues) in cases where the output from the one or more artificial intelligence or machine learning models indicates that the incoming data set is valid with a confidence level that satisfies a threshold, or alternatively in cases where the output from the one or more artificial intelligence or machine learning models indicates that the incoming data set is valid with a confidence level that fails to satisfy the threshold, but the user of the client device indicates that the incoming data set does not contain any anomalies during the anomaly detection workflow. In either case, as shown by reference number 130, the data quality system may store, in the one or more data repositories, the (validated) incoming data set with the historical data sets that have previously been evaluated for data quality issues. Furthermore, as shown by reference number 135, the data quality system may store an indication that the incoming data set has been validated based on the output from the one or more artificial intelligence or machine learning models (e.g., when the confidence level satisfies the threshold) and/or based on the user of the client device indicating that the incoming data set does not contain any anomalies or data quality issues (e.g., during the anomaly detection workflow that is triggered when the confidence level associated with the output from the one or more artificial intelligence or machine learning models fails to satisfy the threshold).

Additionally, or alternatively, as shown in FIG. 1C, and by reference number 140, the data quality system may use one or more artificial intelligence or machine learning techniques to evaluate potential fixes to the incoming data set responsive to identifying one or more anomalies or data quality issues for the incoming data set. More particularly, as described herein, the data quality system may use the one or more artificial intelligence or machine learning models to evaluate the values of the data elements contained in the incoming data set against the documented data quality rules, and may then further use the one or more artificial intelligence or machine learning models to evaluate the values of the data elements contained in the incoming data set against the historical data sets and/or historical data quality results to determine whether there are one or more anomalies or other data quality issues contained in the incoming data set.

In some implementations, the one or more artificial intelligence or machine learning models may generate an output that indicates whether the incoming data set has passed a data quality validation check. In cases where the output generated by the one or more artificial intelligence or machine learning models indicates that the incoming data set fails to satisfy the applicable data quality standards, the output may be associated with a confidence level that indicates a probability or likelihood of the output being correct that the incoming data set fails to satisfy the applicable data quality standards. In cases where the confidence level satisfies a threshold indicating a high confidence that the incoming data set fails to satisfy the applicable data quality standards, the data quality system may automatically implement one or more fixes to resolve the anomalies and/or may automatically update the one or more data repositories that form the data quality knowledge base to include the data quality results for the incoming data set. Alternatively, as shown by reference number 145, the data quality system may trigger the client device to perform the anomaly detection workflow for the incoming data set when the output generated by the one or more artificial intelligence or machine learning models indicates that the incoming data set contains one or more anomalies or other data quality issues with a confidence level that fails to satisfy a threshold. In such cases, the data quality system may generate one or more user interfaces to indicate the potential anomalies or data quality issues to the client device, and a user of the client device may review the potential anomalies or data quality issues to confirm that the anomalies or data quality issues exist or indicate that the potential anomalies or data quality issues are false positives.

Accordingly, as described herein, the data quality system may determine that the incoming data set is invalid (e.g., may generate an indication that the incoming data set contains data anomalies or other data quality issues) in cases where the output from the one or more artificial intelligence or machine learning models indicates that the incoming data set is invalid with a confidence level that satisfies a threshold, or alternatively in cases where the output from the one or more artificial intelligence or machine learning models indicates that the incoming data set is invalid with a confidence level that fails to satisfy the threshold but the user of the client device indicates that the incoming data set does contain one or more anomalies during the anomaly detection workflow. In either case, the data quality system may evaluate possible changes to fix or otherwise resolve the anomalies or data quality issues based on previously identified data quality issues and/or fixes that were previously applied to fix previously identified data quality issues. In some implementations, as shown by reference number 150, the data quality system may then implement the fixes to resolve the data quality issues (e.g., by updating the data values in the data source). Additionally, or alternatively, as shown by reference number 155, the data quality system may trigger a data quality resolution workflow, in which the anomalies or data quality issues along with the suggested or recommended fixes are presented to the user of the client device. Accordingly, the user of the client device may view information related to the identified anomalies or data quality issues and the suggested or recommended fixes, and the user may either approve, roll back, or reject the suggested or recommended fixes. Furthermore, as shown by reference number 160, the data quality system may store, in the one or more data repositories, the incoming data set associated with the anomalies or data quality issues together with the historical data sets that have previously been evaluated for data quality issues. Furthermore, as shown by reference number 165, the data quality system may store an indication that the incoming data set contains anomalies or data quality issues based on the output from the one or more artificial intelligence or machine learning models (e.g., when the confidence level satisfies the threshold) and/or based on the user of the client device indicating that the incoming data set contains one or more anomalies or data quality issues (e.g., during the anomaly detection workflow that is triggered when the confidence level associated with the output from the one or more artificial intelligence or machine learning models fails to satisfy the threshold). Furthermore, the information stored with the historical data quality results may include information related to the suggested or recommended fixes, including whether the suggested or recommended fixes were automatically implemented, implemented after review by the user of the client device, and/or rolled back following review by the user of the client device.

As indicated above, FIGS. 1A-1C are provided as an example. Other examples may differ from what is described with regard to FIGS. 1A-1C.

Figure 2:
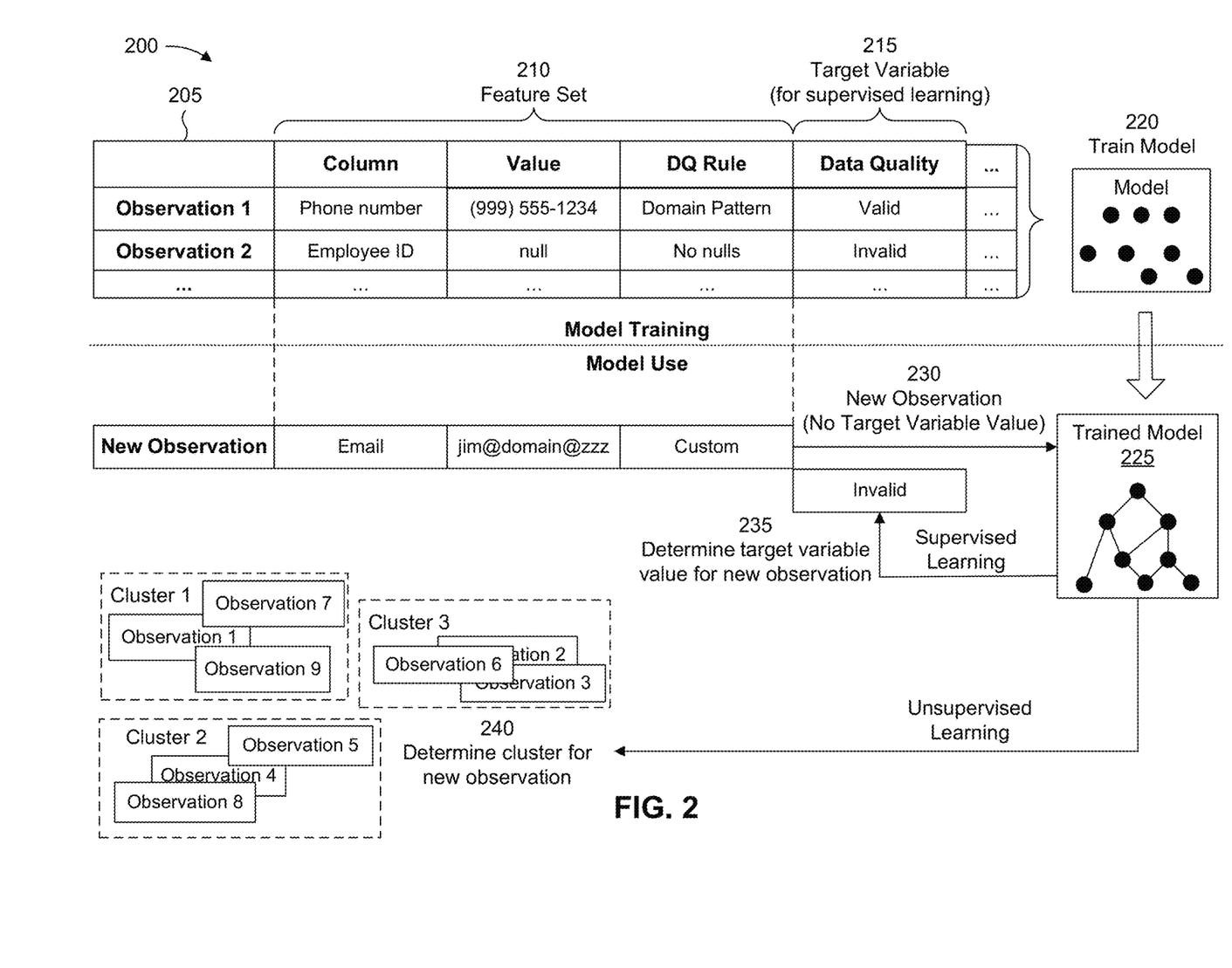
FIG. 2 is a diagram illustrating an example of training and using a machine learning model in connection with an artificial intelligence system for data quality resolution, in accordance with some embodiments of the present disclosure.

FIG. 2 is a diagram illustrating an example 200 of training and using a machine learning model in connection with data quality resolution. The machine learning model training and usage described herein may be performed using a machine learning system. The machine learning system may include or may be included in a computing device, a server, a cloud computing environment, or the like, such as the data quality system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the data source, the data quality knowledge base, and/or the data quality system, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the data source, the data quality knowledge base, and/or the data quality system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of column, a second feature of value, a third feature of data quality rule, and so on. As shown, for a first observation, the first feature may have a value of phone number, the second feature may have a value of (999)555-1234, the third feature may have a value of domain pattern, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is data quality, which has a value of valid for the first observation.

The feature set and target variable described above are provided as examples, and other examples may differ from what is described above. For example, for a target variable of potential data quality fix, the feature set may include features such as a column, a value, a data quality rule, previous fixes, status for a previous fix, and so on.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As an example, the machine learning system may obtain training data for the set of observations based on previous (e.g., historical) data sets that were evaluated for data quality issues and/or fixes that were applied, approved, rolled back, rejected, or the like for anomalies or other data quality issues identified in the historical data sets.

As shown by reference number 230, the machine learning system may apply the trained machine learning model 225 to a new observation, such as by receiving a new observation and inputting the new observation to the trained machine learning model 225. As shown, the new observation may include a first feature of email address, a second feature of "jim@domain@zzz", a third feature of custom, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of invalid for the target variable of data quality for the new observation (e.g., based on the custom data quality rule specifying that a valid email address must contain the "@" symbol and that the "@" symbol must be used only once), as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation to change the second instance of the "@" symbol to a ".". The first automated action may include, for example, changing the second instance of the "@" symbol to a ".".

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., valid data elements), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include information that indicates whether one or more data quality issues were identified, potential fixes that were recommended to resolve one or more data quality issues, and/or whether the potential fixes were applied or rejected (e.g., by a user).

In this way, the machine learning system may apply a rigorous and automated process to detecting data quality issues and/or determining potential fixes to resolve one or more data quality issues. The machine learning system may enable recognition and/or identification of tens, hundreds, thousands, or millions of features and/or feature values for tens, hundreds, thousands, or millions of observations, thereby increasing accuracy and consistency and reducing delay associated with detecting data quality issues and/or determining potential fixes to resolve one or more data quality issues relative to requiring computing resources to be allocated for tens, hundreds, or thousands of operators to manually detect data quality issues and/or determine potential fixes to resolve one or more data quality issues using the features or feature values.

As indicated above, FIG. 2 is provided as an example. Other examples may differ from what is described in connection with FIG. 2.

Figure 3:
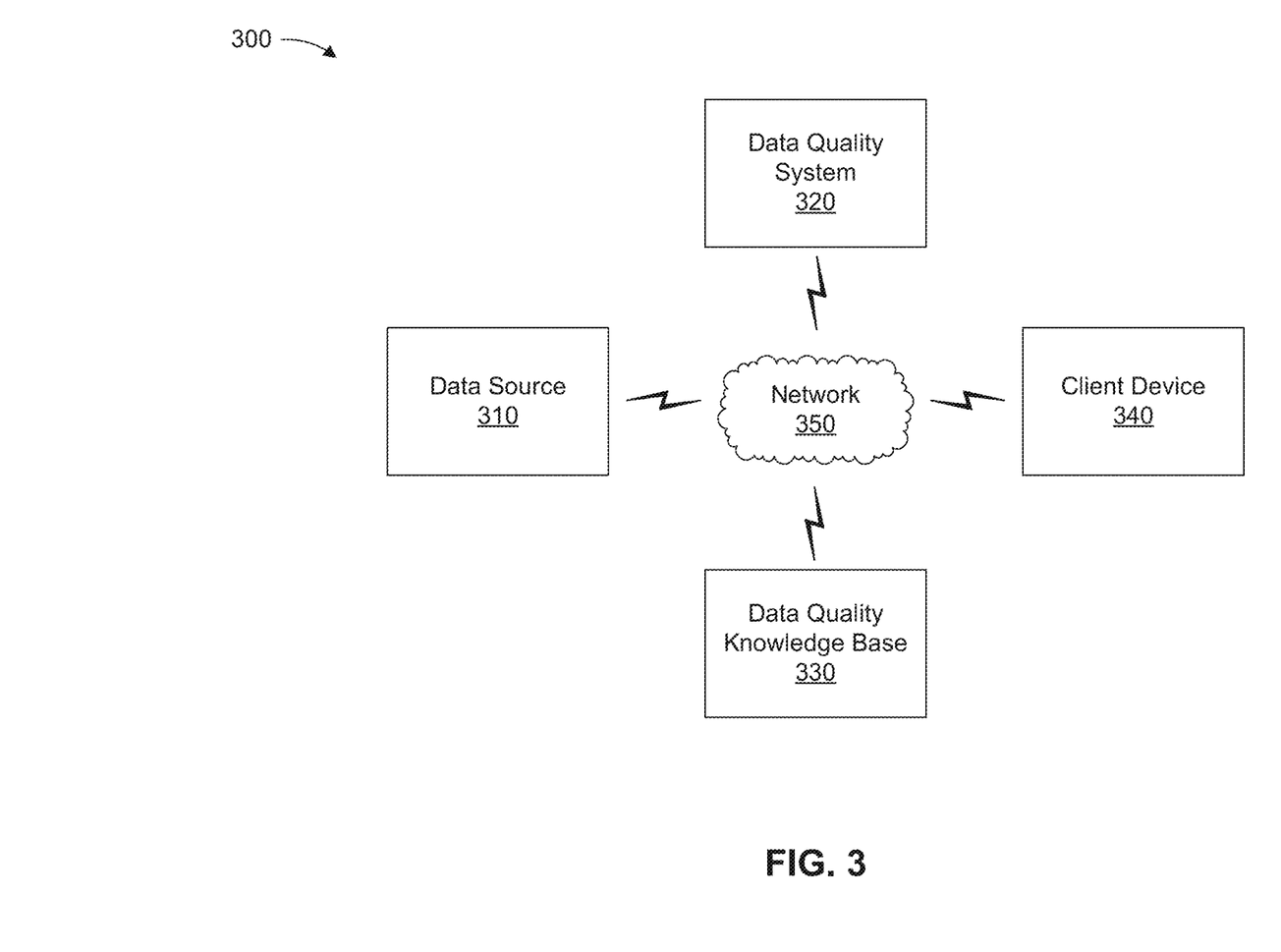
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a data source 310, a data quality system 320, a data quality knowledge base 330, a client device 340, and a network 350. Devices of environment 300 may interconnect via wired connections, wireless connections, or a combination of wired and wireless connections.

The data source 310 may include one or more devices capable of receiving, generating, storing, processing, and/or providing information associated with using machine learning or artificial intelligence techniques to validate and resolve data quality, as described elsewhere herein. The data source 310 may include a communication device and/or a computing device. For example, the data source 310 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the data source 310 may store one or more data sets that are validated for data quality issues using one or more machine learning or artificial intelligence models, as described elsewhere herein.

The data quality system 320 may include one or more devices capable of receiving, generating, storing, processing, providing, and/or routing information associated with using machine learning or artificial intelligence techniques to validate and resolve data quality, as described elsewhere herein. The data quality system 320 may include a communication device and/or a computing device. For example, the data quality system 320 may include a server, such as an application server, a client server, a web server, a database server, a host server, a proxy server, a virtual server (e.g., executing on computing hardware), or a server in a cloud computing system. In some implementations, the data quality system 320 may include computing hardware used in a cloud computing environment. As an example, the data quality system 320 may use one or more machine learning or artificial intelligence models to validate one or more data sets stored in the data source 310 and/or to identify and/or implement one or more potential fixes to the one or more data sets stored in the data source 310 in cases where the one or more machine learning or artificial intelligence models indicate that the one or more data sets stored in the data source 310 have potential anomalies or other data quality issues, as described elsewhere herein.

The data quality knowledge base 330 may include one or more devices capable of receiving, generating, storing, processing, and/or providing information associated with using machine learning or artificial intelligence techniques to validate and resolve data quality, as described elsewhere herein. The data quality knowledge base 330 may include a communication device and/or a computing device. For example, the data quality knowledge base 330 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the data quality knowledge base 330 may store documented rules that define requirements and an expected format and/or an expected structure for one or more data sets ingested from the data source 310, historical data sets that have been evaluated for data quality issues, historical data quality results related to the historical data sets, or the like, as described elsewhere herein.

The client device 340 may include one or more devices capable of receiving, generating, storing, processing, and/or providing information associated with using machine learning or artificial intelligence techniques to validate and resolve data quality, as described elsewhere herein. The client device 340 may include a communication device and/or a computing device. For example, the client device 340 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. As an example, the client device 340 may be operated by a data analyst (user) or another suitable user, and the user of the client device 340 may interact with the data quality system 320 to assist with anomaly detection for one or more data sets ingested from the data source 310 and/or to review and/or approve one or more potential fixes to address potential anomalies or other data quality issues associated with one or more data sets, as described elsewhere herein.

The network 350 may include one or more wired and/or wireless networks. For example, the network 350 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 350 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
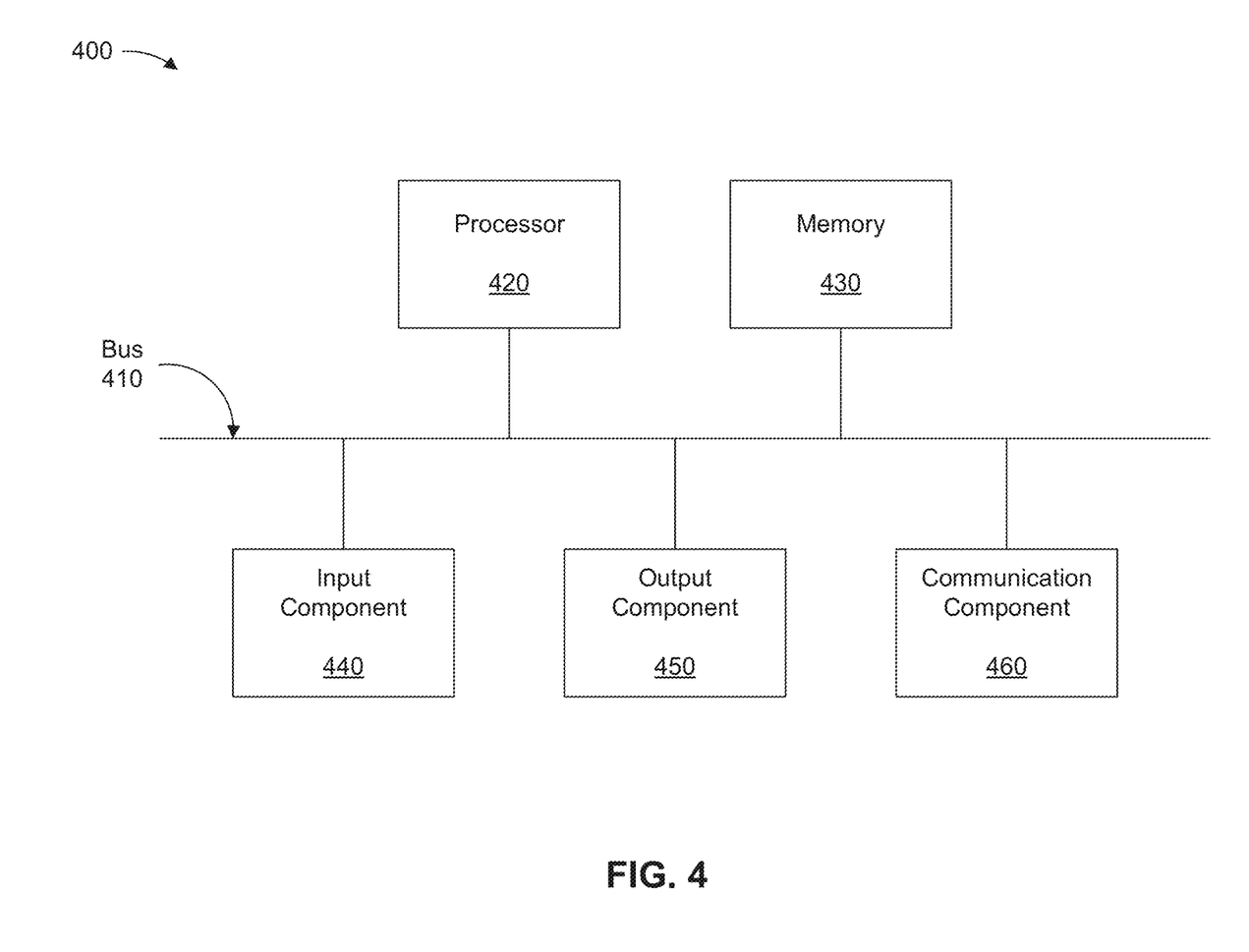
FIG. 4 is a diagram of example components of a device associated with an artificial intelligence system for data quality resolution, in accordance with some embodiments of the present disclosure.

FIG. 4 is a diagram of example components of a device 400 associated with an artificial intelligence system for data quality resolution. The device 400 may correspond to the data source 310, the data quality system 320, the data quality knowledge base 330, and/or the client device 340. In some implementations, the data source 310, the data quality system 320, the data quality knowledge base 330, and/or the client device 340 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
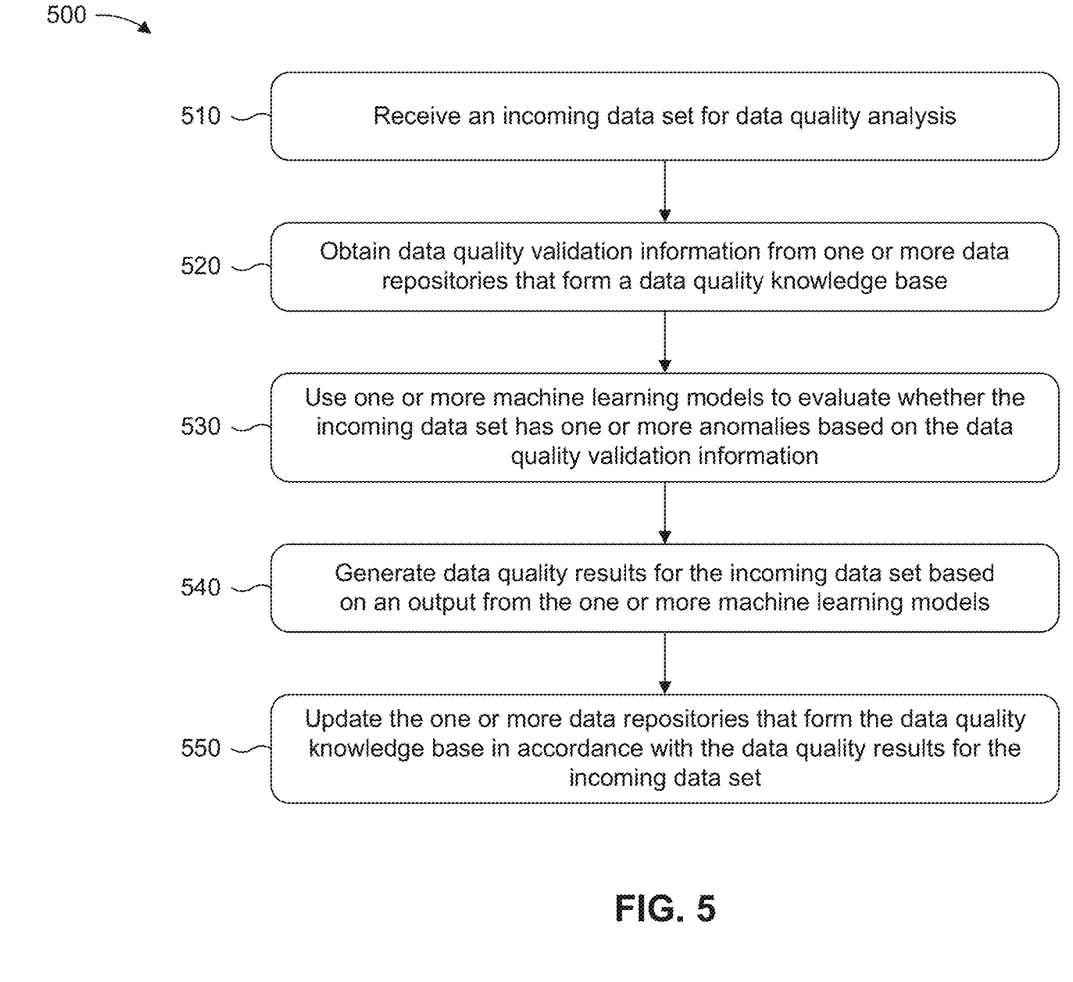
FIG. 5 is a flowchart of an example process associated with an artificial intelligence system for data quality resolution, in accordance with some embodiments of the present disclosure.

FIG. 5 is a flowchart of an example process 500 associated with an artificial intelligence system for data quality resolution. In some implementations, one or more process blocks of FIG. 5 may be performed by the data quality system 320. In some implementations, one or more process blocks of FIG. 5 may be performed by another device or a group of devices separate from or including the data quality system 320, such as the data source 310, the data quality knowledge base 330, and/or the client device 340. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving an incoming data set for data quality analysis (block 510). For example, the data quality system 320 (e.g., using processor 420, memory 430, input component 440, and/or communication component 460) may receive an incoming data set for data quality analysis, as described above in connection with reference number 105 of FIG. 1A. As an example, the data quality system may receive an incoming data set that includes a new data set, a new data entry, or new data for an existing data set to be evaluated for data quality analysis.

As further shown in FIG. 5, process 500 may include obtaining data quality validation information from one or more data repositories that form a data quality knowledge base (block 520). For example, the data quality system 320 (e.g., using processor 420 and/or memory 430) may obtain data quality validation information from one or more data repositories that form a data quality knowledge base, as described above in connection with reference number 110 of FIG. 1A. In some implementations, the data quality validation information includes documented rules that define requirements and an expected format for the incoming data set, historical data sets that have been evaluated for data quality issues, and historical data quality results related to the historical data sets. As an example, the data quality knowledge base includes one or more data repositories that contain information related to various rules that may be derived from business rules or logic to specify one or more parameters to ensure that a data set, data value, or the like satisfies data quality standards related to accuracy, completeness, consistency, uniqueness, or the like. Furthermore, the data quality knowledge base includes information related to previous data sets that have been evaluated for data quality issues and previously logged data quality analysis results (e.g., from log stores, pipeline logs, enterprise incidences, and/or changes or fixes that were previously applied or recommended to resolve data anomalies or other data quality issues).

As further shown in FIG. 5, process 500 may include using one or more machine learning models to evaluate whether the incoming data set has one or more anomalies based on the data quality validation information (block 530). For example, the data quality system 320 (e.g., using processor 420 and/or memory 430) may use one or more machine learning models to evaluate whether the incoming data set has one or more anomalies based on the data quality validation information, as described above in connection with reference number 115 of FIG. 1A. As an example, the one or more machine learning models may evaluate values of data elements in the incoming data set against the documented rules or standards related to the expected format and structure of the data values and against information that relates to previous data sets that were determined to be valid and/or invalid to detect anomalies or other data quality issues in the incoming data set.

As further shown in FIG. 5, process 500 may include generating data quality results for the incoming data set based on an output from the one or more machine learning models (block 540). For example, the data quality system 320 (e.g., using processor 420 and/or memory 430) may generate data quality results for the incoming data set based on an output from the one or more machine learning models, as described above in connection with reference number 115 of FIG. 1A. As an example, the one or more machine learning models may generate an output indicating that the incoming data set is valid or invalid, and the output may be associated with a confidence level. Accordingly, in some examples, the data quality results may indicate whether the incoming data set is valid or invalid when the confidence level satisfies a threshold, and/or an anomaly detection workflow may be triggered to initiate user review in cases where the confidence level fails to satisfy the threshold. Furthermore, in cases where the incoming data set is determined to be invalid, the data quality results may include potential fixes to resolve the data quality issues and/or information indicating whether the potential fixes were approved or rejected by one or more users (e.g., data analysts).

As further shown in FIG. 5, process 500 may include updating the one or more data repositories that form the data quality knowledge base in accordance with the data quality results for the incoming data set (block 550). For example, the data quality system 320 (e.g., using processor 420 and/or memory 430) may update the one or more data repositories that form the data quality knowledge base in accordance with the data quality results for the incoming data set, as described above in connection with reference numbers 120-135 of FIG. 1B and/or reference numbers 140-165 of FIG. 1C. As an example, the incoming data set may be stored with the historical data sets, and the data quality results (e.g., including the indication of whether the incoming data set is valid or invalid, and/or any recommended changes to resolve data quality issues that were identified for the incoming data set) may be stored in the data quality knowledge base to improve the knowledge available for detecting and/or resolving anomalies in subsequent data sets.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1C. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for validating and resolving data quality, the system comprising:
one or more memories; and
one or more processors, communicatively coupled to the one or more memories, configured to:
import, from a data source, an incoming data set for data quality analysis;
obtain data quality validation information from one or more data repositories that form a data quality knowledge base,
wherein the data quality validation information includes documented rules that define requirements and an expected format for the incoming data set, historical data sets that have been evaluated for data quality issues, and historical data quality results related to the historical data sets;
use one or more machine learning models to evaluate whether the incoming data set has one or more anomalies based on the data quality validation information;
generate data quality results for the incoming data set based on an output from the one or more machine learning models, wherein the data quality results for the incoming data set are associated with a confidence level that indicates an accuracy of the data quality results for the incoming data set;
implement, based on the confidence level satisfying a threshold for the accuracy of the data quality results for the incoming data set, one or more fixes to resolve the one or more anomalies; and
update the one or more data repositories that form the data quality knowledge base in accordance with the data quality results for the incoming data set.

2. The system of claim 1, wherein the data quality results for the incoming data set include an indication that the incoming data set has been validated based on the output from the one or more machine learning models indicating that the incoming data set does not contain any anomalies and that the confidence level satisfies the threshold.

3. The system of claim 1, wherein the one or more processors, to generate the data quality results for the incoming data set, are configured to:
trigger a client device to perform an anomaly detection workflow for the incoming data set based on the output from the one or more machine learning models indicating that the incoming data set does not contain any anomalies and that the confidence level fails to satisfy the threshold,
wherein the data quality results for the incoming data set include an indication that the incoming data set has been validated based on a user of the client device indicating that the incoming data set does not contain any anomalies during the anomaly detection workflow.

4. The system of claim 1, wherein the one or more processors, to update the one or more data repositories that form the data quality knowledge base, are configured to:
store, in the one or more data repositories, the incoming data set with the historical data sets that have been evaluated for data quality issues; and
store, in the one or more data repositories, an indication that the incoming data set has been validated based on one or more of the output from the one or more machine learning models or a user of a client device indicating that the incoming data set does not contain any anomalies.

5. The system of claim 1, wherein the one or more processors are further configured to:
use the one or more machine learning models to identify the one or more fixes,
wherein the one or more fixes are to be applied to the incoming data set based on the data quality results for the incoming data set including an indication that the incoming data set has one or more anomalies, and
wherein the one or more fixes are identified based on historical anomalies and historical fixes included in the historical data quality results.

6. The system of claim 1, wherein the one or more processors are further configured to:
apply the one or more fixes to the incoming data autonomously based on the output from the one or more machine learning models indicating that the incoming data set has the one or more anomalies and that the confidence level satisfies the threshold.

7. The system of claim 1, wherein the one or more processors are further configured to:
trigger a client device to perform a data quality resolution workflow for the incoming data set based on the output from the one or more machine learning models indicating that the incoming data set has the one or more anomalies and that the confidence level fails to satisfy the threshold,
wherein information related to the one or more fixes to the incoming data set are presented to the client device during the data quality resolution workflow.

8. The system of claim 7, wherein the one or more processors are further configured to:
apply the one or more fixes to the incoming data based on a user of the client device approving the one or more fixes during the data quality resolution workflow.

9. The system of claim 7, wherein the one or more processors are further configured to:
discard the one or more fixes based on a user of the client device rejecting the one or more fixes during the data quality resolution workflow.

10. The system of claim 1, wherein the one or more processors, to update the one or more data repositories that form the data quality knowledge base, are configured to:
store, in the one or more data repositories, the incoming data set with the historical data sets that have been evaluated for data quality issues; and
store, in the one or more data repositories, an indication of the one or more anomalies identified in the incoming data set and information related to the one or more fixes.

11. A method for validating and resolving data quality, comprising:
importing, by a data quality system and from a data source, an incoming data set for data quality analysis;
obtaining, by the data quality system, data quality validation information from one or more data repositories that form a data quality knowledge base,
wherein the data quality validation information comprises documented rules that define requirements and an expected format for the incoming data set, historical data sets that have been evaluated for data quality issues, and historical data quality results related to the historical data sets;
using, by the data quality system, one or more machine learning models to evaluate whether the incoming data set has one or more anomalies based on the data quality validation information;
generating, by the data quality system, data quality results for the incoming data set based on an output from the one or more machine learning models,
wherein generating the data quality results for the incoming data set includes using the one or more machine learning models to identify one or more fixes to be applied to the incoming data set based on the data quality results for the incoming data set including an indication that the incoming data set has one or more anomalies, and
wherein the data quality results for the incoming data set are associated with a confidence level that indicates an accuracy of the data quality results for the incoming data set;
implementing, based on the confidence level satisfying a threshold for the accuracy of the data quality results for the incoming data set, the one or more fixes to resolve the one or more anomalies; and
updating, by the data quality system, the one or more data repositories that form the data quality knowledge base in accordance with the data quality results for the incoming data set.

12. The method of claim 11, wherein the one or more fixes are identified based on historical anomalies and historical fixes included in the historical data quality results.

13. The method of claim 11, further comprising:
applying the one or more fixes to the incoming data autonomously based on the output from the one or more machine learning models indicating that the incoming data set has the one or more anomalies and that the confidence level satisfies the threshold.

14. The method of claim 11, further comprising:
triggering a client device to perform a data quality resolution workflow for the incoming data set based on the output from the one or more machine learning models indicating that the incoming data set has the one or more anomalies and that the confidence level fails to satisfy the threshold, wherein information related to the one or more fixes to the incoming data set are presented to the client device during the data quality resolution workflow.

15. The method of claim 14, further comprising:
applying the one or more fixes to the incoming data based on a user of the client device approving the one or more fixes during the data quality resolution workflow.

16. The method of claim 14, further comprising:
discarding the one or more fixes based on a user of the client device rejecting the one or more fixes during the data quality resolution workflow.

17. The method of claim 12, wherein updating the one or more data repositories that form the data quality knowledge base comprises:
storing, in the one or more data repositories, the incoming data set with the historical data sets that have been evaluated for data quality issues; and
storing, in the one or more data repositories, an indication of the one or more anomalies identified in the incoming data set and information related to the one or more fixes.

18. A non-transitory computer-readable medium storing a set of instructions, the set of instructions comprising:
one or more instructions that, when executed by one or more processors of a data quality system, cause the data quality system to:
import, from a data source, an incoming data set for data quality analysis;
obtain data quality validation information from one or more data repositories that form a data quality knowledge base,
wherein the data quality validation information includes documented rules that define requirements and an expected format for the incoming data set, historical data sets that have been evaluated for data quality issues, and historical data quality results related to the historical data sets;
use one or more machine learning models to evaluate whether the incoming data set has one or more anomalies based on the data quality validation information;
generate data quality results for the incoming data set based on an output from the one or more machine learning models,
wherein the data quality results for the incoming data set include an indication that the incoming data set has been validated based on one or more of the output from the one or more machine learning models or a user of a client device indicating that the incoming data set does not contain any anomalies, and
wherein the data quality results for the incoming data set are associated with a confidence level that indicates an accuracy of the data quality results for the incoming data set;
implement, based on the confidence level satisfying a threshold for the accuracy of the data quality results for the incoming data set, one or more fixes to resolve the one or more anomalies; and
update the one or more data repositories that form the data quality knowledge base in accordance with the data quality results for the incoming data set.

19. The non-transitory computer-readable medium of claim 18, wherein the data quality results for the incoming data set include the indication that the incoming data set has been validated based on the output from the one or more machine learning models indicating that the incoming data set does not contain any anomalies and that the confidence level satisfies the threshold.

20. The non-transitory computer-readable medium of claim 18, wherein the one or more instructions further cause the data quality system to:
trigger the client device to perform an anomaly detection workflow for the incoming data set based on the output from the one or more machine learning models indicating that the incoming data set does not contain any anomalies and that the confidence level fails to satisfy the threshold.

\* \* \* \* \*